Figure 4:
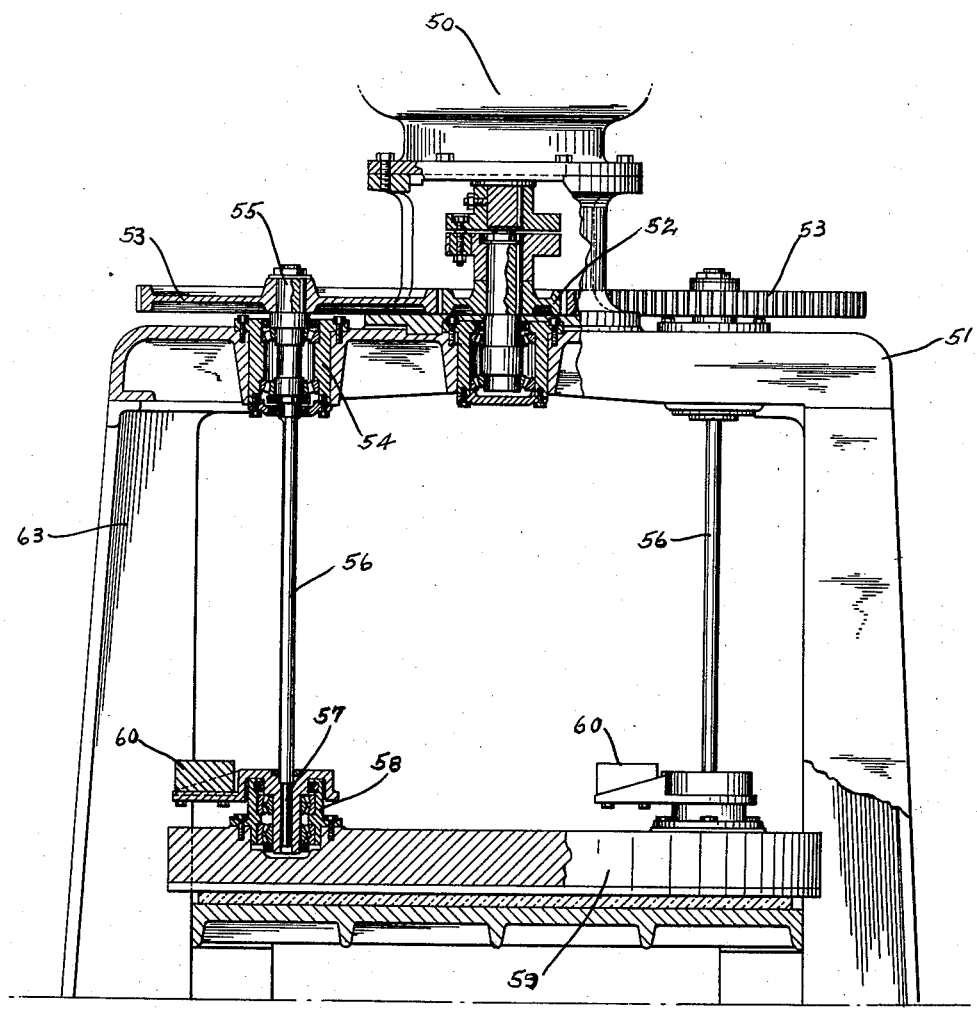

July 19, 1960     I. PEYCHES     2,945,330
APPARATUS FOR SURFACING GLASS
Filed Jan. 17, 1957     2 Sheets-Sheet 1
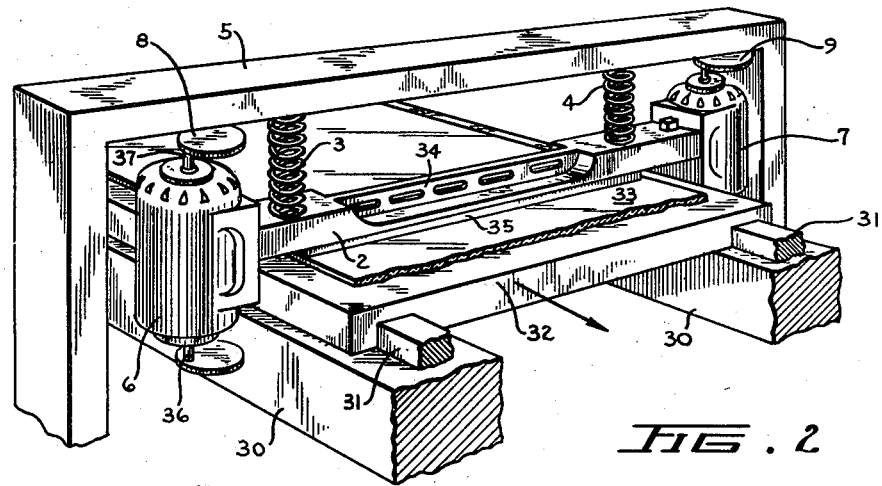
FIG. 2
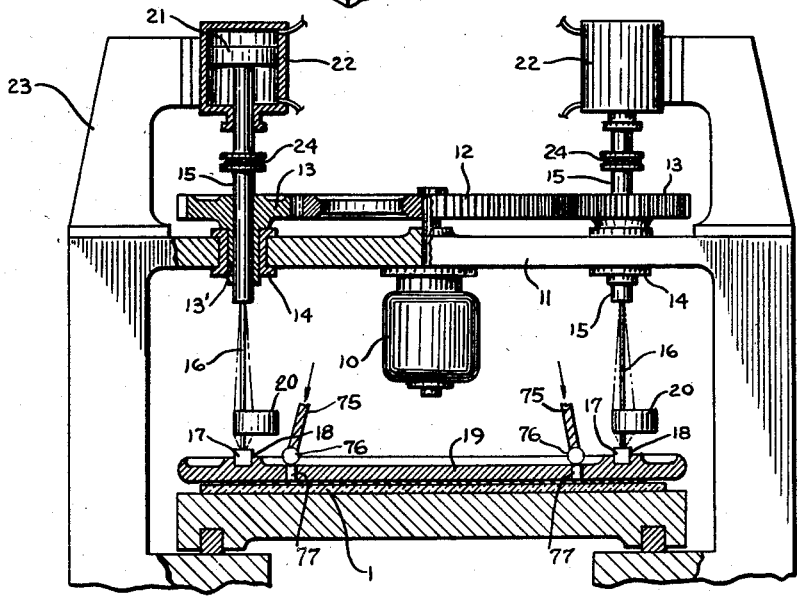
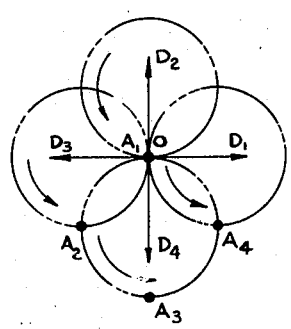
FIG. 3
FIG. 1
INVENTOR.
IVAN PEYCHES
BY
Bauer and Seymour
ATTORNEYS

United States Patent Office 2,945,330
Patented July 19, 1960

2,945,330
APPARATUS FOR SURFACING GLASS

Ivan Peyches, Paris, France, assignor to Societe Anonyme des Manufactures des Glaces et Produits Chimiques de Saint-Gobain, Chauny & Cirey, Paris, France Filed Jan. 17, 1957, Ser. No. 634,665

16 Claims. (Cl. 51—119)

This invention concerns the surfacing of glass, a term which includes both grinding and polishing. The invention is very useful in the continuous surfacing of glass, such as plate glass, and it will be described in connection with the polishing of sheets of glass, but it is to be understood that the particular description is for purposes of illustration and does not constitute a limitation on the generality of the invention.

This application is a continuation-in-part of co-pending application Ser. No. 288,824, filed May 20, 1952, for Process and Apparatus for Surfacing Glass, now Patent No. 2,787,100, issued April 2, 1957.

This invention concerns the continuous process of glass surfacing, i.e. a process where the sheet glass moves at a slow pace along a straight path and is ground and polished by means of tools arranged one after the other along the path of the glass. These tools which exercise a certain pressure on the glass, are given a surfacing motion on the surface of the glass and they are supplied with grinding or polishing abrasives grains which are fed between the tools and the glass in order to rub the glass and surface it. The nature and size of the abrasive grains and the material of the rubbing surface of the tools vary according to the purpose which they are designed to effect.

It is an object of this invention to improve the surfacing of sheets of glass, particularly plate glass.

Another object is to produce apparatus capable of efficiently carrying out the new process.

These objects have been accomplished as set forth fully hereinafter.

In the known apparatus used to carry out the surfacing of glass sheets the motion imparted to the tools is such that the different points of said tools follow curved trajectories having a great curvature radius.

I have found that the grinding and polishing working is more efficient if each point of the glass surface is submitted to a greater number of actions exerted in all directions.

In principle, the process of the invention is characterized in that the tool which surfaces the glass executes a periodic movement of translation along directrix closed curves of small amplitude. The explanation given in what follows, relates to the case in which the said movement of translation follows a circular directrix; this movement, in which all the points of the tool describe circumferences of circles of equal radius, at equal velocity, and in the same directions, is designated hereinafter by the term homocircular movement.

In a preferred form of the invention, this homocircular motion is applied to the tools, and the sheet of glass is given a linear translation motion at a regular rate relatively to the tools.

In the process for the continuous surfacing of a glass sheet according to the invention, the surfacing action is exercised by at least one device having an active surface of which the dimension, in the direction of the displacement of the glass sheet, is constant from one lateral edge to the opposite edge of the sheet, the device being given a periodic translation movement of small amplitude comprised between about one millimeter to several centimeters along directrix closed curves, in particular circular curves.

The surfacing device may be constituted by a single rectangular element extending from one lateral edge of the glass sheet to the other. But it may also be formed of a plurality of elements juxtaposed or staggered one relatively to the other, for example disposed in quincunx, these elements being so arranged that their total area has in the direction of the displacement of the glass sheet, a dimension which is constant from one lateral edge to the other of the glass sheet.

One of the discoveries upon which this invention is based, concerns the life of the grains of abrasive material in the surfacing compositions. It has been shown that the life of a large grain of sand of the usual kind on the order of a half mm. in diameter, that is to say, the time during which it acts efficiently to perform its intended function under a surfacing tool, does not exceed about 20 revolutions of the grain, that is to say $\frac{1}{20}$ to $\frac{1}{100}$ of a second. It should be understood of course that the fragments of the grain may be used again, and may have a new life, in a more advanced phase of the work under a different tool. It is difficult to directly measure the life of those fine particles, that have a diameter on the order of 20 mu, but it has been established that the small particles have a much longer life and will endure a higher number of rotations upon themselves under the corresponding tools, for instance several hundreds of rotations, even though the absolute duration of their lives does not represent more than about $10^{-3}$ to $10^{-4}$ second.

I have discovered, that to use an abrasive with full efficiency, because of the short life of the grain, it is necessary that the equatorial plane of the grain be rotated and turned in such a way that the grain shall have presented successively all its faces to the sheet of glass. This has been accomplished by the present invention.

The applicant has discovered, as a part of this invention, that the grains last longer and act better if they are subjected to the action of a surfacing tool having a periodic translation motion of an amplitude which is a function of the size of the grain. In general, the motion imparted to the grain by the tool will be circular, and in this case the radius of the circular motion imparted to the grain will be related to the grain as a function of its size; thus, for the large grains with which the surfacing operation starts, and which are on the order of a ½ mm. in diameter, the optimum diameter of the homocircular movement of the tool should be between about 4 cm. and one cm., while, for the medium size grains of sand of the order of 50 mu in size, the optimum diameter of the homocircular motion is between 10 and 5 mm.; for the finest surfacing composition containing grains of sand on the order of 10 to 20 mu, the diameter of the homocircular movement should be between about 5 and 2 mm.

The foregoing is particularly for the stage of the operation of surfacing that is technically called grinding. When we approach the part of surfacing which is called polishing, we are confronted with a different state of the glass and a different state of the materials employed. The polishing compositions do not act only by abrasion, but actually by subjecting the surface of the glass to plastic flowing; furthermore, the kind and the fineness of the abrasive are the same from the beginning to the end of the operation, the major difference being the quantity of liquid which is present with respect to the abrasive at different times of the polishing. Examinations under the microscope with phase contrast, have shown that between the depressions of the surface of the glass there is a mean distance which increases little by little in the course of polishing during the wet stage and considerably during the semi-dry stage. Thus, in a polishing apparatus containing 24 successive tools, aligned along the path of the glass moving under them, the distance between the centers of depressions in the surface of the glass is on the order of 1/5 mm. at the eighth tool. To spread out these depressions by plastic flowing of the glass and to run them into one another in order to make them practically disappear, the polisher must have an amplitude of movement sufficient to bear on several crests at one time, for instance on 5 to 10. Therefore, the radius of homocircular movement imposed on the polisher should be on the order of a millimeter during the wet phase and a centimeter during the dry phase of polishing. Thus, the amplitude of the homocircular motion decreases as the grinding progresses and increases as the polishing progresses. During grinding, as the work is carried on with finer and finer grinding materials, the amplitude of the circular movement decreases. In polishing, the amplitude increases with the advance in the work although there is no change in particle size, under normal conditions.

It is one of the characteristics of the invention to employ homocircular motion of small amplitude of the tools upon the abrasive composition and the result is an improvement in the grinding and polishing of the glass, and an improvement in the uniformity of utilization of the abrasive grains and the efficiency of their action.

In accordance with another characteristic of the invention, the periodic movement along curves of small amplitude should be executed at high frequency in order to compensate for the short trajectory traversed during each period by the abrasive grains and because I have also ascertained that the efficiency of the surfacing operation is increased when the actions, to which the glass is submitted in different directions, follow one another at smaller time intervals. In a general manner, according to the invention the frequency may be of an order comprised between about one hundred and several thousands revolutions per minute.

The frequency can be chosen to communicate to the grains of abrasive, linear velocities, with respect to the surface of glass, which are on the order of magnitude of the speeds attained in classic apparatus, while, because of their better efficiency in working as explained hereinabove, it is not necessary to attain linear velocities which are as high in order to obtain comparable quality. Thus, by imparting linear velocities equal to those of the prior art, a better polishing is accomplilshed, and by imparting linear velocities considerably lower, a result equal to that of the prior art is attained. Thus, it is possible to obtain a result as good as that produced by the prior art with linear speeds which are only 1/10 of those of the standard apparatus of the prior art, whereas the pressures need only be doubled. As applied to the large size particles, the speed of rotation most favorable is comprised between one hundred or several hundreds turns per minute and it may attain for the finer particles several thousands turns per minute.

The process of the invention is indicated and apparatus embodying the invention is illustrated in the accompanying drawings:

Fig. 1 is a diagram of homocircular motion as applied to a point. Fig. 2 is a perspective view of one type of apparatus embodying the principles of the invention. Fig. 3 is an elevational view partially in section of another type of apparatus involving the principles of the invention. Fig. 4 is an elevational view partially in section of another apparatus according to the invention.

In Fig. 1 there is represented the effect of homocircular motion as applied to a point O on the surface of a sheet of glass. $A_1$, $A_2$, $A_3$ and $A_4$ are four distinct points on the surface of the tool, chosen so that their trajectories pass through the point O on the surface of the glass. The diameters of the trajectories of all points are identical. The point $A_1$ was selected to coincide with point O, the point $A_2$ is one-quarter turn removed, the point $A_3$ is a half turn removed and the point $A_4$ is three-quarters turn removed from point O. Thus, in a single revolution each of the four points will pass through the point O. Every other point on the surface of the tool goes through an identical circle in a different place. In polishing moving glass plates the point O will progress slightly between the arrival of the different points $A_1$ to $A_4$. The trajectory of each point of the tool will be transformed from a circle into a cycloid. When the point $A_1$ of the tool passes the point O it smooths the glass in the direction $D_1$ tangent to its trajectory, but when the point $A_2$ arrives at O it smooths the glass in the direction $D_2$; when the point $A_3$ arrives it smooths the glass in the direction $D_3$ and the point $A_4$ smooths it in the direction $D_4$. The tangent to the homocircles at the point O is thus being changed by 90° with each quarter turn.

It is to be understood that it is only for purposes of simplification that the matter has been explained in the terms of a single point on the glass and four points on the tool. In reality, during the length of time corresponding to a quarter revolution, there will be an infinity of trajectories described by other points of the tool which pass over the point O, so that the glass is smoothed in an infinity of directions uniformly progressing from each other during a single revolution of the tool. According to the principle of the invention, this time is very short so that each point of the surface of the glass is subjected to perfectly symmetrical actions, and is repeatedly subjected to such actions, before the point has been materially displaced by the advance of the glass sheet. By this means, there is avoided the well known fault called "directional polishing" which results from working which has a preponderant effect in on direction, and which is manifest when anyone employs the tools of the prior art, which operate at a relatively low frequency on paths of great amplitude. Heretofore, in order to overcome this directional polishing, it has been necessary to have recourse to artifices such as variation in time of working, in the position of the tool, or when the tool is fixed, to stagger the successive tools relatively one to another in order to approach as closely as possible to the ideal of perfect working. None of these artifices are necessary with this invention.

All the characteristics of the invention unite the most favorable conditions not only as to the efficiency of using the abrasives, but in particular with respect to the uniformity of the effect upon the glass.

In everything which has gone hereinbefore, in order to facilitate the explanation, reference has been had only to homocircular movements of the tool, but it should be understood that it is within the dominion of the invention to employ any form of homocurvilinear motion, for example, motion in the form of various ellipses, and the principle can be carried, by elongation of the ellipses to the point of reducing the movement to a straight line vibration, but in the latter case it is necessary that the rectilinear line of action of the vibrating tool change constantly in direction so as to work isotropically upon the surface of the glass. In the case of ellipses and other non-circular homocurvilinear closed figures, the axis of the curve should change its direction constantly. Homocircular motion is preferred because it works perfectly and evenly upon the surface and because the construction of the machinery to carry it out does not involve the difficulties which attend the construction of machinery producing elliptical figures.

In constructing the apparatus of the invention, one may utilize any means which will produce in the tool a rapid, periodic motion of small amplitude, for example, a circular movement of translation can be obtained by giving to two points of the tool an identical circular rotational movement in synchronism. It is also possible to obtain this result by combining two straight line oscillatory movements perpendicular to each other of the same size but in quadrature. If on the contrary, these oscillatory movements are of amplitudes and periods that are variable, the resulting movements will be in the form of pseudo-ellipses, similar to the figures of Lissajou, of which the axes vary in dimensions and/or in direction, constantly and rapidly, and which are within the scope of the invention. These movements can be obtained, for example, by means of vibrations generated by electro-magnets.

In Figs. 2 and 3 of the drawings are illustrated apparatus corresponding to the principles of the invention.

In Fig. 2 the numeral 30 indicates the frame of the machine, upon which are mounted tracks 31, over which moves a bed plate 32, which carries the sheet of glass which is to be worked. The bed plate 32 is moved slowly from the left to the right in the machine as shown in the drawing. A sheet of glass 33 is laid upon the bed plate of the machine and is subjected to the operation of the tool 2. A frame 5 extends over the glass transporting apparatus which has just been described. This frame 5 may be fixed in position or may be made movable as desired. During the operation of the machine it will be fixed when operated as shown in the drawings. The surfacing apparatus is composed of a beam 2 which is preferably composed of light material such as magnesium aluminum alloy and is centrally shaped as a T beam 34 to reduce weight. On the bottom of this beam is the surfacing tool or facing 35 which may be constituted by a material depending upon the stage to which the work has progressed. The surfacing tool 35 according to the invention has an elongated rectangular active surface and extends over the whole width of the glass sheet in order to have the same action from one lateral edge of the sheet to the other. Because of the small amplitude of the periodic motion imparted to the tool, the dimension of the tool in the direction of the displacement of the glass sheet may be, for example, of the order of 20 to 50 times the amplitude of this periodic motion. Consequently a given point of the glass sheet will be submitted to a great number of actions exerted in all directions during its passage under the same tool i.e. during the same phase of the treatment. Means such as shown in Fig. 3 are provided for feeding abrasive composition to the surfacing tool 35, feeding being at the rate indicated above as being designed to most efficiently employ the grains of the composition. Two coil springs 3, 4 bear upon the bottom of the frame 5 and upon the top of the beam 2; except for these springs, the beam is free to move. On opposite ends of the beam 2 are motors 6, 7, which may be of any desired type, preferably electrical, and preferably synchronous motors. These motors have a shaft which extends out through the casing at each end as indicated at 36, 37 and on the ends of this projecting shaft are eccentric counter-weights or fly wheels 8 and 9. The fly wheels of the motor 7 and the fly wheels of the motor 6 are given the same orientation so that their vibratory effects will be combined and impart true homo-circular motion of small amplitude to the beam 2. When the motors are energized, the eccentric weights revolve rapidly at the speeds of the motors and impart to the beam homocircular motion of small amplitude and high rate of revolution. The counter weights 8, 9 are preferably of the same weight, size and disposition. The motors are so constructed and coupled that the counterweights shall, at every instant, be oriented in the same direction and turn in synchronism and in phase. The amplitude of the movement will depend upon the total mass which is undergoing the movement.

The facing of the beam 35 may be of elastic material such as a layer of semi-hard rubber or of felt. The liquid used for polishing, which is generally a suspension of iron oxide in water, is introduced from a suitable source (not shown) through flexible tubes 75 beneath the polisher through small fittings 76 into passages 77 leading to the under face.

The rectangular shape of the beam is particularly advantageous because, as the beam has very small displacement when it is operating, the successive beams can be brought so closely together as practically to cover the entire surface of the plate of glass being worked, which has never been possible with the usual circular tools operating with rotary motion, which of necessity leave areas between them which are uncovered. Because of this advantage, the invention markedly reduces the dimensions of the apparatus with respect to the area of surface which the apparatus works.

It is to be observed that because of the rectangular form of the surfacing tools and of the small amplitude of their movement, it is not necessary that they overlap the edges of the band of glass in order to obtain an equal polish on all the useful surface of the glass, as is necessary in the employment of circular tools. By utilizing tools having a length slightly inferior to the width of the plate of glass, surfacing takes place equally throughout substantially the whole width of the sheet with the exception of a very thin irregular part along the border which is of no use and is thrown away. The possibility of utilizing a tool which does not overlap the edge of the sheet of glass has the advantage of preventing the wearing away of the felt at the edge of the tool, which occurs when the ordinary tools, which do overlap, are employed.

It is to be understood that the tools can be aligned obliquely to the course of the glass if any advantage is produced thereby in particular cases.

In Fig. 3 there is disclosed a different form of the invention, in which a frame 23, supplied with a cross bar 11, supports a vertically arranged motor 10 having a shaft which passes through the beam 11 and is connected to a gear 12. The gear 12 meshes with gears 13—13 which are mounted in bearings 14—14 by means of hollow shafts 13'—13' which are shown to be cast integrally with the gears. Shafts 15 pass through the gears 13—13 and are keyed thereto against relative rotary motion but longitudinal motion of the shafts 15 with respect to the gears 13 is not prevented. Thrust bearings 24, of ball or roller type, are mounted on the upper ends of the shafts 15 and thin, flexible shafts 16 project downwardly from the bottoms of the shafts 15 and terminate in enlarged cylindrical heads 17 which are received in bearings 18 in the upper part of the beam 19 of the working tool. On the flexible shafts 16 are two counterweights 20 which are aligned in accordance with the principles set forth in the discussion of Fig. 2. As the motor 10 drives the gears, the shafts 15 and 16 are rotated and the counterweights 20 impart to the beam 19 homocircular motion. The frame 23 carries, on extensions projecting above the bar 11, two cylinders 22, 22 within which are pistons 21 having rods which project, through stuffing boxes in the bottoms of the cylinders, into contact with the thrust bearings 24. By admitting gas pressure, such as compressed air or steam to the upper face of the pistons 21, pressure can be applied upon the beam 19 to the extent desired.

In an alternative method of construction, not illustrated, the shafts 16 are not flexible but are rigid and the cylinders 17 are eccentrically mounted on the bottom of the shafts with an eccentricity which may be equal to one-half the desired diameter of the homocircle.

It sometimes happens that a tiny irregularity in the surface of the working face of the tool begins the formation of a line which is somewhat differently worked than neighboring regions of the glass plate, but this slight defect is without inconvenience in most cases, for example, during the grinding portion of the surfacing operation and during the first part of polishing, because the plate of glass passes under a series of tools which compensate for and remove the defects before the plate is finished. On the other hand, if this slight defect occurs in the last operations, for instance, about or after the termination of the wet polishing, the latter part of the polishing may not rub out the lines. When this condition arises the surface is perfectly polished but, has, nonetheless, a slightly combed appearance when viewed in a particular light. In order to prevent the formation of these lines, in cases where they are observed to arise, it is possible to impart to the surfacing tools, in addition to the homocircular movement, a slow alternating motion or reciprocating motion across the surface of the glass in a direction transverse to the movement of the sheet. This practice, however, has the disadvantage that it carries the buffing surface over the edge of the sheet of glass and introduces a different degree of wear in those surfaces which engage the edge of the glass and those which do not.

In Fig. 4 there is disclosed a different form of the invention, in which a frame 63, supplied with a cross bar 51, supports a vertically arranged motor 50 having a shaft which passes through the beam 51 and is connected to a gear 52. The gear 52 meshes with gears 53—53 which are mounted on shafts 55 rotating in the bearings 54 of the ball or roller type. Thin, flexible shafts 56 project downwardly from the bottoms of the shafts 55 and terminate in longitudinally grooved heads 57 which are received in bearings 58 in the upper part of the beam 59 of the working tool. On the flexible shafts 56 are two counterweights 60 which are aligned in accordance with the principles set forth in the discussion of Fig. 2. As the motor 50 drives the gears, the shafts 55 and 56 are rotated and the counterweights 60 impart to the beam 59 homocircular motion.

The following concepts are believed to be novel: a process for surfacing glass sheets in which there is applied to the surface of the glass an abrasive action by means of tools employing homocurvilinear motion, in a closed figure, preferably homocircular, at small amplitude of an order comprised between one millimeter and several centimeters; the said process in which at least one tool has an active surface, in the direction of the displacement of the glass sheet, of constant dimension from one lateral edge to the other of the sheeet; a process in which the said very small amplitude is a function of the size of the abrasive, for example, with homocircular movement and for sand of the usual sizes, homocircles of from one to four centimeters diameter for the large size (½ mm.) sand, five to ten millimeters in diameter for the medium size sand (50 mu), and two to five millimeters for the fine, (10–20 mu); a process in which the frequency is of an order comprised between one hundred to several thousands turns per minute and for example, in the case of homocircular movement and with the usual sizes of grinding composition, of about one or several hundreds of turns per minute for the large size grains, and may attain several thousands turns per minute for the finer grains; these ranges are preferred orders of magnitude but the limits stated are not equatorial.

The process also, when applied to polishing, as distinguished from grinding, involves the following concepts: the amplitude of the motion of the tool increases as the working advances and as the polishing nears its end; the amplitude of movement during the wet phase of the polishing is on the order of a millimeter; the amplitude of movement during the dry phase of polishing is on the order of a centimeter.

In an apparatus constructed in accordance with the principles of the invention, the tool is preferably very long and thin, rigid and light, extending transversely from one edge to the other of the sheet of glass and is covered on its working face with a layer of felt, rubber, or the like, beneath which the liquid containing the abrasive is led onto the surface of the glass, preferably by a large number of supply tubes which can penetrate the tool itself or which can be arranged beside the tool; the tool is given its small amplitude of movement by the reaction of counterweights eccentrically mounted with respect to the axis of rotation; the movement may be imparted to the tool by a motor which is mounted on the tool, or by a plurality of motors mounted on the tool, as illustrated in Fig. 2; the shafts of such motors carry eccentric counterweights, the tools may be given a circular movement of translation, or homocircular motion, by the action of eccentrics, driven from a motor not mounted on the tool, upon two separated points of the tool; the pressure upon the tool upon the glass may be controlled by springs or by pressure means; the tool may be disposed obliquely with respect to the line of motion of the plates of glass.

In addition to the homocurvilinear motion, the tool may be given a slow and sufficient reciprocating motion transversely of the glass.

This apparatus produces isotropic translatory motion of the runner on the glass. Translatory motion has been utilized previously but isotropic translatory motion has been first employed by this inventor. The diagram of Fig. 1 illustrates translatory motion as applied to a motionless piece of glass. Glass grinding in commercial installations, and glass polishing, are largely carried out upon sheets which are moving in a straight line. Consequently, each point on the surface of the tool cannot return to the point from which it started, after making one revolution, but to another point which may be close to or far from the point of departure depending upon the velocity of the glass, the amplitude of the closed curve described by the point on the tool, and the velocity. With the relatively large amplitudes, and relatively low velocities of the prior art isotropic action could not be obtained and its existence could not be suspected. Isotropic translatory motion is a discovery forming a part of this invention. It is attained for all known rates of advance of moving glass employed in industry at amplitudes between 1 mm. and several centimeters, which are less than amplitudes previously described, and by velocities between 100 and several thousand r.p.m. which are generally higher than velocities previously employed.

As many apparently widely different embodiments of the present invention may be made without departing from the spirit and scope thereof, it is to be understood that the invention is not limited to the specific embodiments.

What is claimed is:

1. Apparatus for surfacing glass in sheet form that comprises means to move a sheet of glass along a path, a glass working member of substantially uniform width extending across the path and means to impart to said working member a periodic translatory motion along closed directing curves, in particular circular, with an amplitude comprised between about one millimeter and several centimeters.

2. An apparatus according to claim 1 in which the working member is constituted by a rectangular element extending from one side of the sheet to the other.

3. An apparatus according to claim 1 in which the working member is constituted of several elements which are disposed in such a manner that the total surface of the elements has, in the direction of displacement of the sheet, a constant dimension from one edge to the other of the sheet.

4. An apparatus according to claim 1 in which the working member is disposed obliquely with respect to the direction of the displacement of the sheet of glass.

5. An apparatus according to claim 1 in which means are provided for imparting to the working member, in addition to the translatory motion, a large and slow periodic movement across the line of movement of the glass.

6. Apparatus for surfacing glass in sheet form that comprises means to move a sheet of glass along a path, a working member of substantially uniform width extending across the path means to impart to said working member a periodic translatory motion along closed directing curves, in particular circular, with an amplitude comprised between about 1 mm. and several centimeters, means to feed a grinding composition to the working member, and resilient means to press the working member against the glass.

7. Apparatus for surfacing glass in sheet form that comprises means to move a sheet of glass along a path, a working tool of substantially uniform width extending substantially across the path, means to impart to said tool closed curve translatory motion of an amplitude comprised between 1 mm. and several centimeters, said means comprising shafts connected to said tool at its ends, eccentric counter-weights on said shafts, and means to rotate said shafts.

8. Apparatus for surfacing glass in sheet form that comprises means to move a sheet of glass along a path, a working tool of substantially uniform width extending substantially across the path, means to impart to said tool a closed curve translatory motion of an amplitude comprised between 1 mm. and several centimeters, said means comprising flexible vertical rods connected to said tool at its ends, eccentric counterweights on said rods and means to rotate said rods about their axes.

9. Apparatus for surfacing glass in sheet form that comprises means to move a sheet of glass along a path, a runner of uniform width extending across the path, means to impart to said runner closed curve translatory motion of an amplitude comprised between 1 mm. and several centimeters, said means comprising a motor which is secured to the tool and the shaft of which carries an eccentric mass.

10. Apparatus for surfacing glass in sheet form that comprises means to move a sheet of glass along a path, a runner of substantially uniform width mounted for closed curve translatory motion extending across the path, means to impart to said runner translatory motion of an amplitude comprised between 1 mm. and several centimeters, said means comprising a centrifugal mass attached to the runner.

11. Apparatus for surfacing glass in sheet form that comprises means to move a sheet of glass along a path, a working tool of substantially uniform width extending substantially across the path, means to impart to said tool closed curve translatory motion of an ampiltude comprised between 1 mm. and several centimeters, and means to drive the tool at a translatory velocity between 100 and several thousand r.p.m.

12. An apparatus for surfacing glass in sheet form that comprises means to move a sheet of glass along a path, a working tool of substantially uniform width constituted by a rigid and light tool extending from one lateral edge of the glass sheet to the other and covered with a material comprising felt, rubber or the like, through which the liquid containing the abrasive is brought to the surface of the glass by way of a large number of orifices, and means to impart to said tool a periodic translatory motion of an amplitude between 1 mm. and several centimeters.

13. Apparatus according to claim 1 containing means to drive the working member between about a hundred and several thousand r.p.m.

14. Means for imparting isotropic translatory motion to glass surfacing machinery comprising means to move glass linearly at constant speed, a runner extending substantially across the glass and having substantially uniform width in the direction of motion of the glass, and means to impart isotropic translatory motion to the runner comprising means to impart closed curve translatory motion thereto at an amplitude between 1 mm. and several cm. and means to impart thereto a velocity between about 100 and several thousand r.p.m.

15. Apparatus for surfacing glass in sheet form that comprises means to move a sheet of glass along a path, a working member extending across the sheet of glass and having a dimension in the direction of the displacement of the glass sheet which is constant from one edge to the other of the sheet, and means to impart to said working member a periodic translatory movement which has an amplitude comprised between about one millimeter and several centimeters and a frequency of at least a hundred per minute and is such that each point of the surface of the glass will be traversed by the operative face of the member in directions which vary through 360° during each cycle of said movement.

16. Apparatus for surfacing glass in sheet form that comprises means to move a sheet of glass along a path, a glass working member extending across said path, the working surface of which member has a dimension along lines parallel to the path of the glass sheet which is constant, and means to impart to said working member a periodic translatory motion along closed directing curves, in particular circular, with an amplitude comprised between about one millimeter and several centimeters.

References Cited in the file of this patent

UNITED STATES PATENTS

| | | |
|---|---|---|
| 1,962,766 | Crowley et al. | June 12, 1934 |
| 1,962,767 | Crowley et al. | June 12, 1934 |
| 2,690,036 | Baldridge | Sept. 28, 1954 |